Patented Jan. 31, 1928.

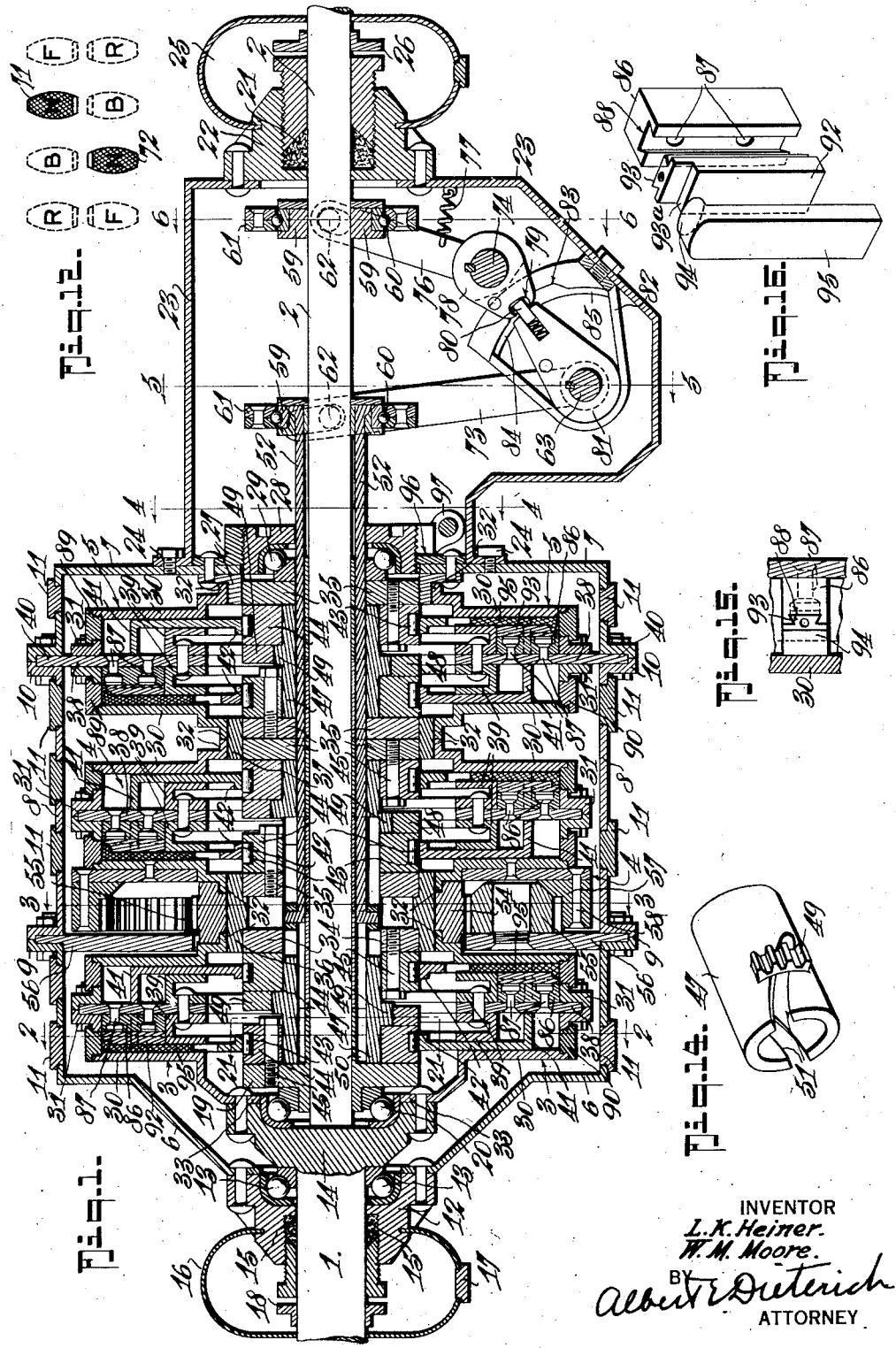

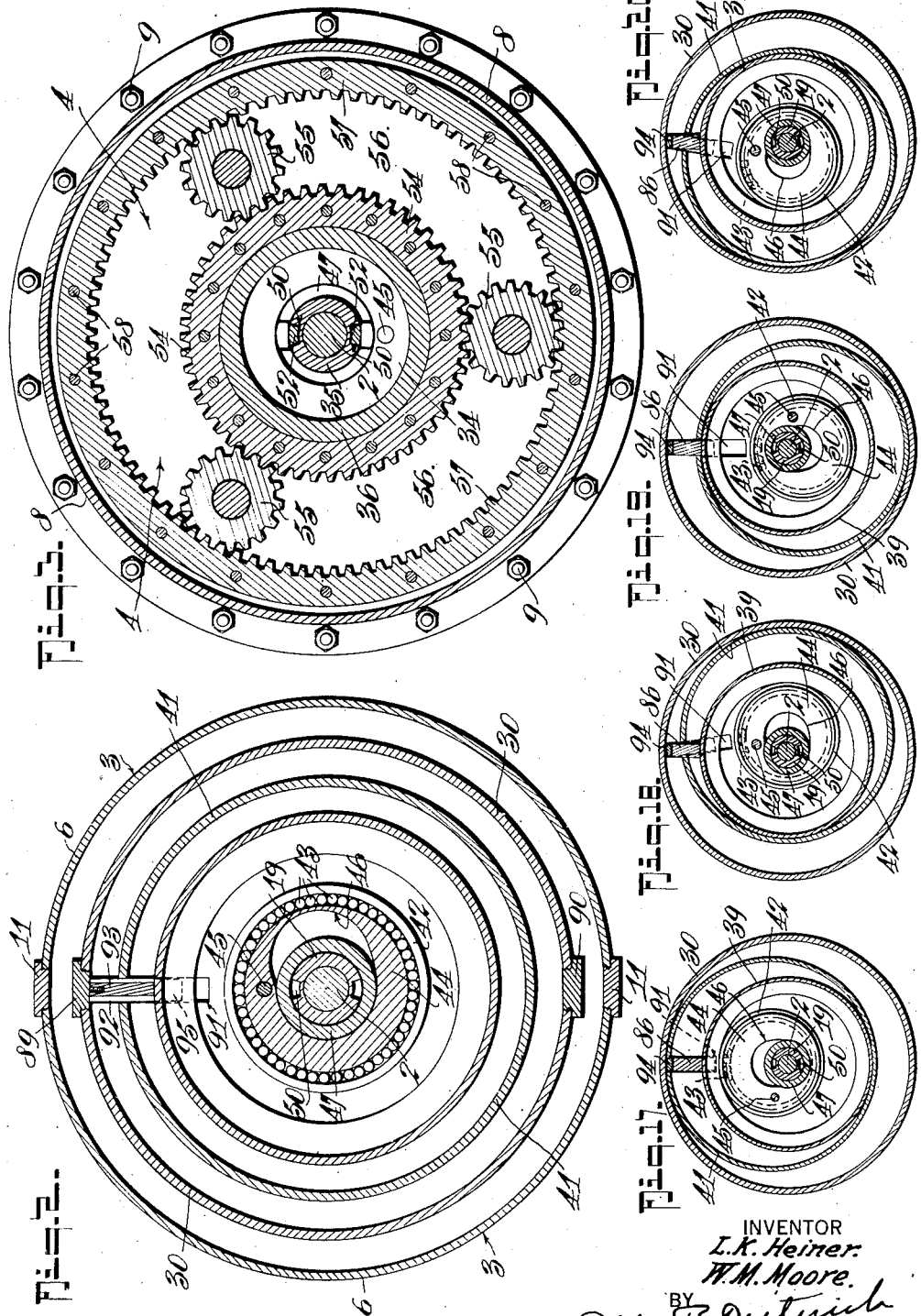

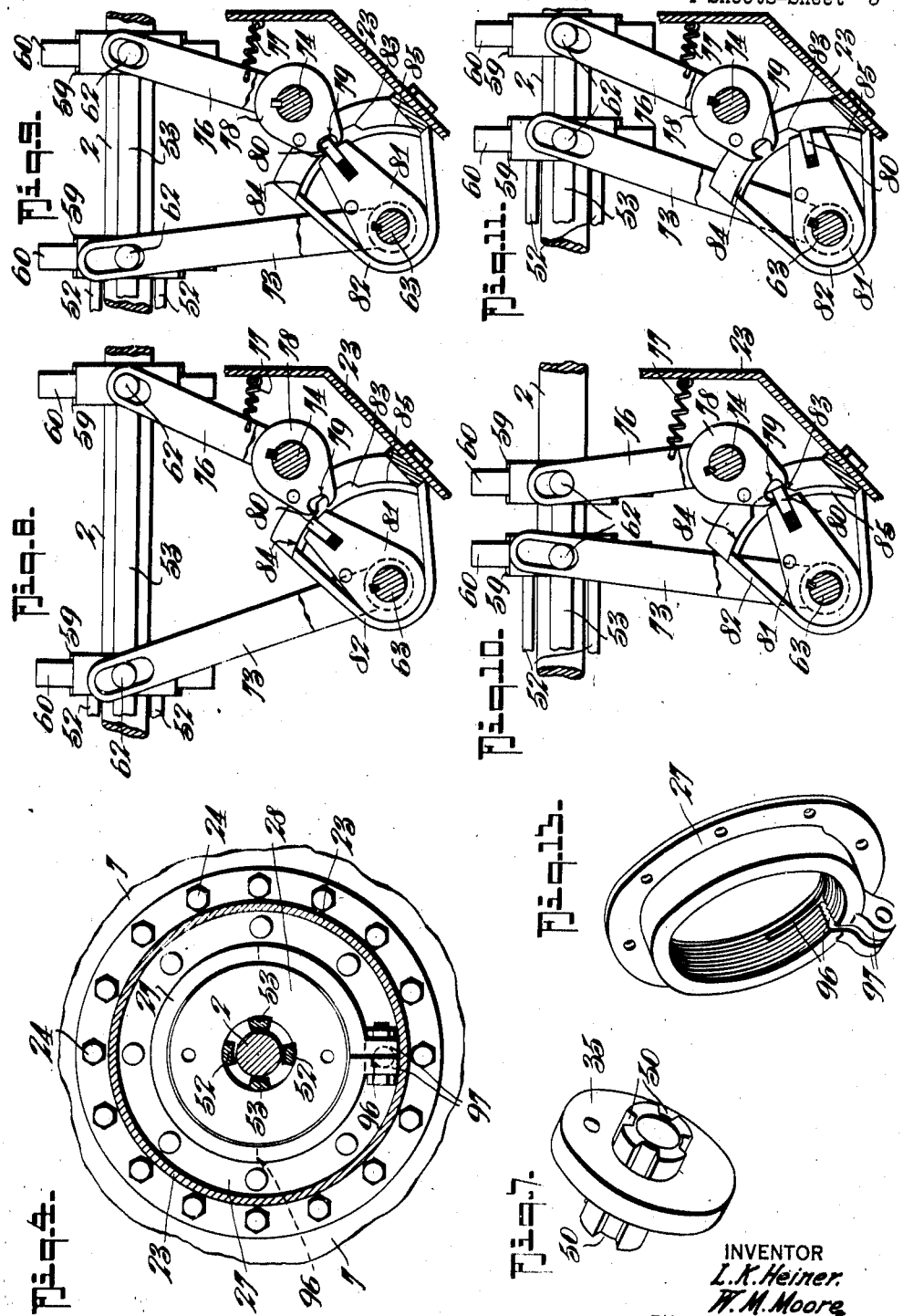

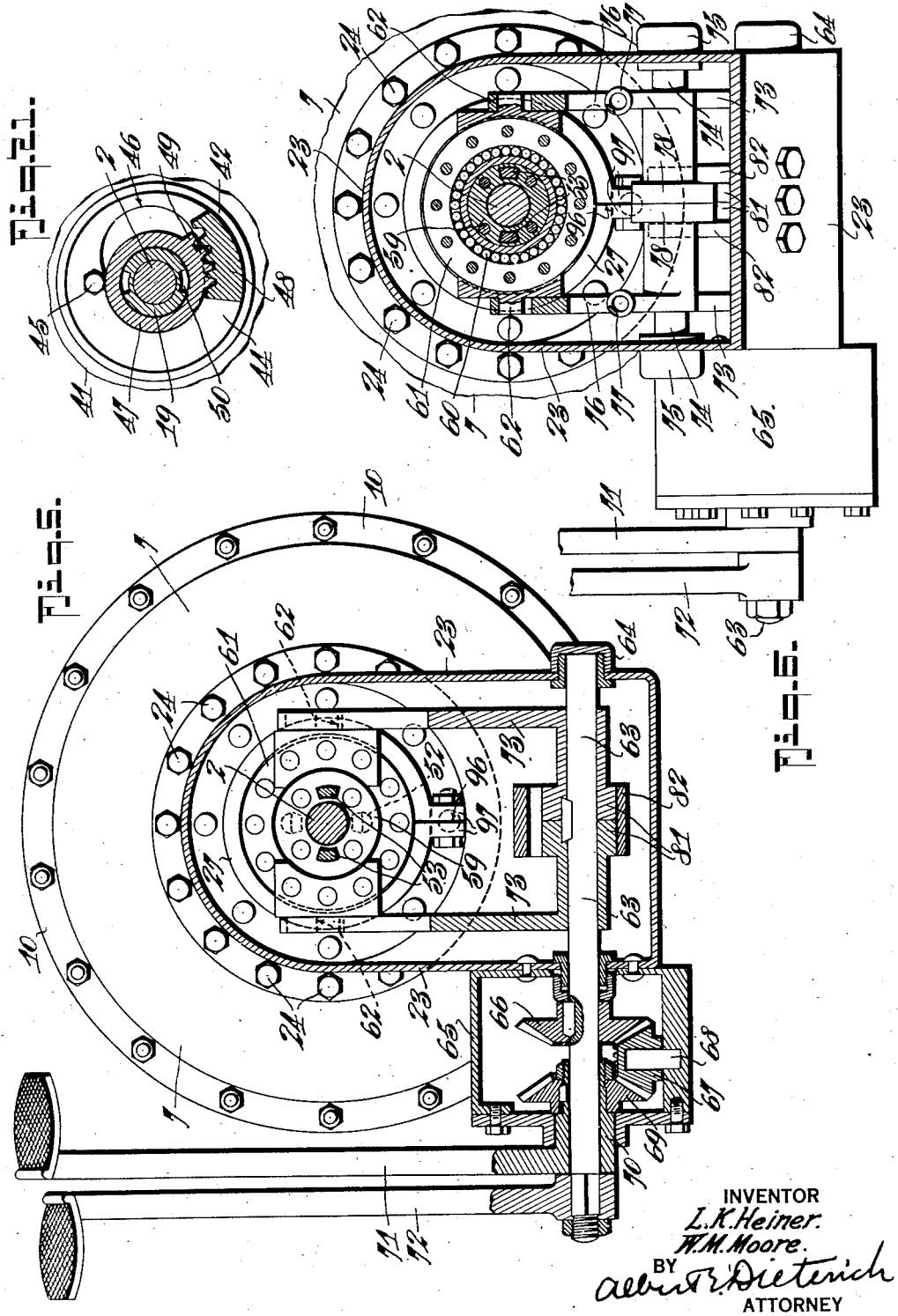

1,657,827

UNITED STATES PATENT OFFICE.

LEONARD KENNETH HEINER AND WILLIAM McKINLEY MOORE, OF PHILLIPSBURG, KANSAS, ASSIGNORS OF ONE-FOURTH TO ALBERT L. ELLIOTT, OF PHILLIPSBURG, KANSAS.

POWER TRANSMITTING AND BRAKE UNIT.

Application filed March 12, 1927. Serial No. 174,924.

The invention generally has reference to power transmission and brake mechanisms of the hydraulic type and primarily has for its object to provide improved mechanism of the character stated wherein is provided a driving shaft, and a driven shaft and means for imparting the rotation of the driving shaft to the driven shaft in like or reverse direction and at substantially the same or at varied diminished speeds at the will of the operator and without the use of speed-change gearing and the usual step-by-step shifting devices.

In its more detailed nature the invention seeks to provide, in mechanism of the type stated, a driving shaft, a driven shaft, a forward variable speed unit, a reversing variable speed unit, and a brake unit, all associated with the driven shaft, the forward and the reversing units, being in constant rotation with the driving shaft, and the brake unit being stationary, and means normally concentric with the driven shaft but capable of eccentric projection in a selected unit to be acted upon by resistance of fluid trapped therein, to impart forward or backward rotation to the driven shaft or to act as a brake to retard forward or backward rotation of said driven shaft according to the unit selected for such projection.

Among other structural features, the invention further resides in the provision of shifting devices for effecting desired driving or braking connection with the driven shaft including means for bringing into active relation with the driven shaft any selected unit, said shifting devices including two sets of shifter rods, simultaneously oppositely movable shifter levers, and connections between one set of rods and the other set whereby said other set will be caused to move with the one set during certain of its movements.

With the above and other objects in view that will hereinafter appear, the invention still further resides in the novel details of construction, combination and arrangement of parts, all of which will be first fully described, then be particularly pointed out in the appended claims, reference being had to the accompanying drawings, in which:—

Figure 1 is a central vertical longitudinal section illustrating the invention, the parts being in the neutral position.

Figures 2, 3, 4, 5 and 6 are vertical cross sections taken on line 2—2, 3—3, 4—4, 5—5, and 6—6 respectively on Figure 1.

Figure 7 is a detail perspective view of one of the flanged rings.

Figures 8, 9, 10 and 11 are diagrammatical elevations illustrating the shifter rod sets movement associating parts in the forward rotation effecting, neutral, maximum brake application effecting, and reverse rotation effecting positions respectively.

Figure 12 is a diagram indicating the relative positions of the reversely movable shifter levers in their respective positions.

Figure 13 is a detail perspective view of the internally threaded flange ring.

Figure 14 is a detail perspective view of one of the rotatable sleeves.

Figure 15 is a detail horizontal section taken through one of the oil circulation obstructing abutments.

Figure 16 is a detail view illustrating the parts which constitute the abutment disassembled.

Figures 17, 18, 19 and 20 are diagrammatic cross sections illustrating the function and movement of the L-shaped abutment pieces.

Figure 21 is a fragmentary cross section illustrating the means for throwing a bearing ring off center.

In the practical development of our invention we provide a driving shaft 1 which may be the engine shaft of an internal combustion engine or any similar rotating element, and a driven shaft 2 mounted in axial alignment therewith.

Associated with the shafts mentioned and having for their purpose to impart forward rotation or reverse rotation from the shaft 1 to the shaft 2 or for braking rotation of the said shaft 2, according to the desires of the operator, a forward rotation effecting unit 3, a reverse rotation effecting unit 4 and a brake action effecting unit 5 are provided, the detailed structure of each of which and their association with the driving and driven shafts will be explained later.

A main housing is provided which is composed of end sections 6 and 7 and an intermediate cylindrical body portion 8 flange connected as at 9 and 10 between the said end sections in the manner illustrated in Figure 1 of the drawings. This housing is adapted to be oil filled and for that purpose is provided with suitable filler and drain plugs 11. The housing end 6 has secured thereto a bearing head 12 having ball bearing equipment at 13 for the shaft 1, which said shaft has an enlarged head 14 and has rotative bearing in the gland 15 carried by the said head 12. The head 12 also carries an oil catch reservoir 16 equipped with a suitable drain plug 17, and an oil throwoff washer 18 is mounted upon the shaft 1 within the reservoir and serves, by centrifugal force, to throw off any oil which may leak out of the housing into engagement therewith into the said reservoir.

The adjacent end of the shaft 2 has secured thereupon a flanged ring 19, more of which will be said later, and said ring, in conjunction with the head 14, comprises means for accommodating ball bearing equipment 20 for that end of the said driven shaft. The other end of the shaft 2 passes through a gland 21 in a bearing head 22 secured to the control housing 23 which is in turn flange secured as at 24 to the housing end section 7, the said bearing head being also equipped with an oil gage reservoir 25 positioned for receiving oil leakage thrown off from the throwoff washer 26.

The end section 7 is provided with an enlarged central aperture through which the shaft section 2 is positioned and the edge of the apparatus is reinforced by flange rings 27, the outermost one of which is internally threaded to receive a bearing adjustment washer 28 which, together with a bearing again secured upon the shaft section 2, accommodates suitable thrust ball bearing equipment 29, adapted to cooperate with the equipment 21 and forming thrust bearings for the driven shaft 2.

It is to be understood that the forward and reverse rotation effecting units 3 and 4 are so associated with the driving shaft, in a manner soon to be described, that they always rotate with the shaft, the former in like direction and the latter in reverse direction. The unit 5 is stationary and does not rotate with either shaft.

Each of the units 3, 4 and 5 is composed of half casing sections 30 flange secured together at 31 and provided with bearing feet 32, the purpose for which will presently appear.

The forward rotation effecting unit casing has a flange 33 which is riveted to the head 14 of the driving shaft 1 and is thus caused to rotate with the said shaft in like direction at all times.

A pivot pin disk 34 is keyed to the driven shaft 2 and adapted to cooperate with the flanged ring 19 and two pairs of such disks, indicated at 35, are similarly keyed to the shaft 2 and each pair is adapted to cooperate with a respective one of the units 4 and 5 in a manner later to be described.

Bearing rings 36 and 37 are secured around the adjacent disks 34 and 35 associated with the units 4 and 5 respectively, and the bearing feet 32 of the units 3 and 4 have rotative bearing on the said rings. The bearing feet of the unit 5 have stationary bearing on the ring 7 and the adjacent reinforce flange 27 in view of the fact that the unit 5 is stationarily mounted in the housing. A partition wall 38 is secured between the flanges of each of the units 3, 4 and 5 and serves to divide each respective unit into two chambers. Suitable inner rings 39 are provided and riveted to opposite sides of the walls 38 to form inner limits and cooperate with the peripheral wall of the respective unit to provide annular chambers.

To provide for holding the unit 5 stationarily and against rotation in the main housing its partition wall is annularly extended, as at 40, and secured between the flanges which secure the housing end 7 to the main housing section 8.

In each of the units 3, 4 and 5 is mounted a pair, one in each annular chamber thereof, of gyral drums 41, each of which is in the nature of a ring-like body having a flange adapted to work more or less piston-fashion within the said chambers, see Figure 1. Each drum has a bearing foot 42 adapted to bear upon the roller bearings 43 provided in the peripheral edge of a respective one of a plurality of drum bearing rings 44, which said rings are mounted for normally bearing concentric relation to the driven shaft 2 but which are capable of being moved off center to project eccentrically into a respective unit 3, 4 or 5.

Two such rings 44 are provided to cooperate with each unit and to provide for the movement thereof just above described, each ring is pivoted off center on pins 45 carried by the respective disks 19, 34 and 35 and have an arcuate slot 46 described on an arc having the respective pin 45 as its center. The pins 45 of each adjacent pair of rings are diametrically oppositely positioned for a purpose later to be described.

A sleeve 47 is rotatably mounted upon the driven shaft 2 in cooperative relation with each cooperating pair of drum bearing rings 44 by being loosely mounted upon the sleeve extensions with which the disks 19, 34 and 35 are equipped, see Figures 1 and 7. The rings 44 are so constructed and arranged as to leave a space between cooperating pairs thereof centrally of the respective units 3, 4 and 5 and of a width approximating the thickness of the said rings. Each drum bearing ring 44 is equipped with a rack segment portion 48 which projects into the space just mentioned and it will be noted that the said segments of cooperating pairs of rings 44 are diametrically oppositely arranged.

Each of the sleeves 47 is equipped with a pair of diametrically oppositely arranged gear segment portions 49 which mesh with the rack segments 48 and cause the bearing rings 44 to move out of concentric relation with the shaft 2 to project eccentrically into the respective drum when the sleeves 47 are rotated in a manner soon to be described.

It will be noticed by reference to Figure 7 of the drawings that the disks 35, 19, 34 are provided with a plurality of longitudinal grooves 50 for longitudinally slidable control rods, more of which will be said later, and by reference to Figure 14, it will be observed that each of the sleeves 47 is provided with a pair of diametrically oppositely positioned angle slots 51, the purpose of which will presently be explained.

For controlling the action of the forward and reverse effective units 3 and 4, control rods 52 are provided and are mounted to rotate with the shaft 2 and be longitudinally slidable in close parallel relation thereto.

Similar control rods 53 are similarly associated with the shaft 2 and have for their purpose to control the action of the brake unit 5.

As hereinbefore stated, the reverse rotation effecting unit 4 is adapted to rotate with the driving shaft 1 but in reverse direction and to accomplish this reverse rotation we provide a gear ring 54 which is rotatably mounted upon the bearing ring 36 and secured to, to rotate with, the adjacent casing portion of the unit 3. This gear ring meshes with idlers 55 carried by the mounting ring 56 clamped between the flanges of the housing sections 6 and 8 and the said idler gears mesh with an internal rim gear 57 secured as at 58 to the unit 4 so that the rotation of the unit 3 is reversely transmitted to the unit 4.

The free ends of each set of the control rods 52 and 53 are projected into the control housing 23 where they are secured in any suitable manner to a head 59 rotatable in bearings 60 in a shifter ring 61 having trunnions 62 projecting laterally therefrom.

The rocker shaft 63 is mounted in the lower portion of the control housing in suitable bearings 64 provided therefor and one end thereof extends through an auxiliary gear housing 65 secured to one side of the said control housing. A bevel pinion 66 is keyed to the shaft 63 within the housing 65 and meshes with an idler gear 67 mounted at 68 in the gear housing and which in turn meshes with bevel pinion 69 keyed to the sleeve 70 rotatable on the projected end of the shaft 63. The sleeve 70 projects slightly beyond the housing 65 and an operating pedal 72 is secured on the projecting end, a similar operating pedal 71 being keyed on the projected end of the shaft 63.

It will be noted that the pedals 71 and 72 are positioned closely adjacent and with their foot engaging portions projected in laterally opposite directions, and by reason of the bevel gears and idler and sleeve connection, forward movement on either pedal will result in backward movement, in like degree and simultaneously of the other pedal.

A pair of slotted levers 73 are keyed to the shaft 63, one at each side of the shaft 2 and adapted to receive the trunnions 62 in the slots thereof so that when the shaft 63 is rocked the control rods 52 will be moved longitudinally with relation to the shaft 2 in degree and direction according to the degree and direction of movement of the shaft 63 and levers 73 keyed thereto.

Another rocker shaft 74 is mounted in suitable bearings 75 in the housing 23 and also has slotted arms 76 keyed thereon to engage the trunnions associated with the control rods 53 for shifting the said rods longitudinally as the shaft is rocked. The slotted arms 76 are normally held to their retracted position illustrated in Figure 1 by retractile springs 77 and are adapted to be moved in the forward or brake setting direction (to the left in Figure 1) by mechanism associated with the rocker shaft 63 as indicated and which will now be explained.

An actuator head 78 is keyed upon the shaft 74 and is provided with a detent receiving recess 79 adapted at times to receive the spring detent 80 carried by the rocker head 81 keyed upon the shaft 63, the association of the heads 78 and 81 and the recess 79 and detent 80 being such that when the detent is in the recess the rocker shaft 74 will be caused to rock with the rocker shaft 63 but in reverse direction.

It is not desired, however, to have the two shafts move constantly together and for this purpose we provide a guard sector 82 having a cut out portion 83 which starts at the neutral position of the parts just described, as illustrated in Figure 1 of the drawings, and extend a short distance in the direction of retractive movement of the rocker shaft 63. A portion of the detent projects into engagement with the guard sector, and the cut out portion 83 is provided at each extremity with a cam portion having for its purpose to disengage the detent from the receiving recess when the said cam portions are engaged upon movement of the head 81 in the respective directions. The forward cam portion is designated 84 and the rearward cam portion 85. The guard sector may be secured to the control housing 23 as indicated in Figure 1 to secure the same stationarily in cooperative relation with the parts described.

As hereinbefore stated the units 3, 4 and 5 are filled with oil and the piston portions of the drums 41 work in the oil in the annular chambers formed in said units. To accomplish the desired power transmission function of the oil in the chambers the oil must be trapped therein against free independent rotation so that it will rotate with the units 3 and 4 and remain stationary in the brake unit 5. Thus when a pair of drum bearing rings are thrown off center into one of the units 3 or 4 the drums carried thereby and which were theretofore freely rotating on said rings, will likewise be moved to eccentric positions in the unit chambers and be caused to take on a rolling motion relatively to the internal periphery of the chambers thereof resisted by the trapped oil. The drums are held, however, against actual rotation relatively to their respective units, being confined to the rolling motion referred to, in a manner soon to be described.

The resistance of the trapped oil overcomes tendency of the drums to move freely in the chambers without imparting rotation, through the drum bearing rings, to the driven shaft 2 and assures transmission of the rotary motion of the unit to the said shaft in degree according to the degree of off center projection of the drum bearing rings and the resistance of the oil.

In a certain sense, each of the units 3, 4 and 5 constitutes a clutch element, in the cases of the units 3 and 4 to clutch the driven shaft 2 in yieldable rotative relation with the driving shaft 1, either in like or reverse direction, and in case of the brake unit 5, to clutch the said driven shaft 2 in braking relation with the inert casing of that unit.

To trap the oil in the unit chambers each thereof is provided with an abutment wall member 86 riveted at 87 to the partition ring and equipped at its outer face with a dove-tail groove 88, the purpose for which will presently appear. It will be noted that the abutments in adjacent chambers of each unit are diametrically oppositely arranged to provide for more perfect balance and the elimination of vibration to the minimum.

It will be observed, by reference to Figure 1, that each unit is equipped with a filler plug 89 and a drain plug 90 for each chamber thereof, the filler plugs being placed at the position of the abutment wall and the drain plugs diametrically opposite.

In order to completely obstruct free oil circulation in the respective annular chambers and at the same time provide for filling of oil into the chamber at each side of the abutment wall and into the interior of the units, as well as to accommodate the movement of the drums while accomplishing the oil obstructing function, the filler plug openings straddle the position of the abutment wall, one drum wall is provided with a slotway 91, and the abutment walls are constructed to include removable portions through the filler plugs.

To thus equip the abutment walls, we provide each with a removable section 92 having a dovetail 93 to removably fit the groove 88 of the member 86, and a head seat 93ª to rockably receive the L-head 94 of the drum slot filler piece 95. It will be noted by reference to Figures 15 and 16 that the head 94 is rounded to enable it to rock on its seat when the piece 95 moves with the drum as indicated in Figures 17, 18, 19 and 20.

When it is desired to fill oil into the interior of the units it is necessary only to remove their filler plugs, withdraw the removable pieces 92 and 95 and pour in the oil directly into the chamber at each side of the abutment wall and through the drum slot 91 into the inside of the unit.

It will be observed by reference to Figure 1, that the piece 95 is of the same thickness as that of the drum side wall the slot of which it projects into, thus serving effectually to close off the drum slot when the apparatus is in operation, while permitting the necessary movement of the drum.

The internally threaded flange 27 which receives the adjustment washer 28 is split at 96 and provided with clamp ears 97 by which adjustment of the washer may be securely locked.

*Operation.*

In describing the operation of the apparatus let us assume the driving shaft 1 to be in rotation carrying with it the forward rotation effecting unit 3 and causing the reverse rotation effecting unit 4 to revolve in reverse direction. The parts are, as illustrated in Figure 1 of the drawing, in neutral position. The shaft 2 is stationary, the drum bearing rings 44 are all concentric with the shaft 2 and the drums thereof rotate freely about the said rings without having any piston-like motion imparted thereto.

The main housing is, of course, stationarily mounted and is filled with a suitable fluid, for example, heavy oil, as are all of the units 3, 4 and 5.

Now let us assume that it is desired to impart rotation to the shaft 2 with the shaft 1 and in like direction. The operator will push forward on the operating pedal 71 causing the control rods 52 to move longitudinally forward.

It will be noticed that each of the control rods 52 and 53 is equipped with a radially outwardly turned head having thereon a roller for working in the angled slots 51 of the respective sleeves 47. Thus the forward movement of the rods 52 will impart rotation to the foremost sleeve 47 causing the gear portions thereof to mesh with the rack portions of the drum bearing rings 44, and cause the said rings to be thrown off center and project eccentrically into the unit 3 in the manner illustrated in Figures 17, 18, 19 and 20.

The gyral drums 41 of the unit 3 were formerly rotating about the same axis as the shaft 2 but this shifting of the rings 44 causes the drums to rotate about an axis eccentric to that of the unit 3 in which they work and consequently causes them to move in a sort of rolling piston-fashion within the chambers formed in the said unit. In this manner the trapped oil in the chambers of the unit 3 is caused to resist the movement of the drums in such manner as to cause them to impart rotation to the shaft 2 at a speed relating to that of the driving shaft 1 in accordance with the degree to which the rings 44 are thrown off center and the resistance set up by oil because of such adjustment.

If it is desired to change the forward motion to a reverse rotation, it is commonly necessary to apply a braking action to precede the reversing action.

To accomplish this, the operator pushes forwardly on the other pedal 71 causing the rods 52 to be moved in a reverse or rearward direction. This causes movement of the head 81 from the forward position it had been moved to in effecting forward rotation of the shaft 2 again to the neutral position illustrated in Figure 1 with its spring detent 80 in the receiving recess in the head 78. Continued rearward movement will cause the head 81 to move the head 78 and the rock shaft 74 causing a reverse or forward movement of the brake control rods 53.

This forward movement of the rods 53 will cause their projected rollers to engage the angle slots of the sleeves 47 associated with the brake unit 5 and impart rotary movement to said sleeve and eccentric projection of the drum bearing rings 44 into the said unit casing moving with them the gyral drums. The resistance set up by the oil serves to brake rotation of the shaft 2 in degree according to the extent of projection of said rings 44.

The rearward movement being continued the spring detent 80 will engage the releasing cam portion 85 and be forced out of the receiving recess 79 allowing the springs 77 to return the head 78, rods 53, sleeve 47 and rings 44 to normal, thus releasing the braking action.

Continued rearward movement will now cause the rods 52 to actuate the sleeve 47 and rings 44 of the reversing unit 4 and cause that unit to impart reverse rotation to the now stationary shaft 2 in the same manner that forward rotation was imparted thereto by the unit 3 as previously explained.

Thus all variations of forward speeds are provided for by the unit 3. Like reverse rotational speeds are imparted by the reversing unit 4, and braking action is accomplished, whenever desired, by the braking unit 5.

Thus it will be observed that from a neutral position, it is possible to go directly into the forward rotation of the brake action applying adjustment. To go from forward into reverse it is necessary first to go through the brake applying condition. The same is not true when it is desired to go from a reverse position into a forward position; part 80 climbs the incline on the lower side of lever 78 and drops into slot 79, from which brake position or forward motion position may be attained.

It should be mentioned that the parts 19, 34 and 35 are suitably secured by keys or other usual fastening means to shaft 2 to turn therewith.

From the foregoing description, taken in connection with the accompanying drawings, it is thought that the novel details of construction, the manner of use, and the advantages of the invention will be readily apparent to those skilled in the art to which it relates.

What we claim is:

1. In transmission gearing and brake mechanism, a driving shaft and driven shaft, forward and reverse change-speed driving connections between said shafts, a brake mechanism on said driven shaft, a plurality of levers for controlling the operation of said driving connections and said brake mechanism, and means for correlating the operation of said levers.

2. In transmission gearing and brake mechanism, a driving shaft and a driven shaft, forward and reverse change-speed driving connections between said shafts, a brake mechanism on said driven shaft associated with said change-speed driving connections, levers for controlling the operation of said driving connections and said brake mechanism, and means for correlating the operation of said levers.

3. In transmission gearing and brake mechanism, a driving shaft and a driven shaft, forward and reverse change-speed driving connections between said shafts, a brake mechanism on said driven shaft, levers for controlling the operation of said driving connections and said brake mechanism, and means for correlating the operation of said levers, said change-speed driving connections and said brake mechanism, including hydraulic clutch elements.

4. In transmission gearing and brake mechanism, a driving shaft and a driven shaft, forward and reverse change-speed driving connections between said shafts, a brake mechanism on said driven shaft, levers for controlling the operation of said driving connections and said brake mechanism, means for correlating the operation of said levers, said brake mechanism including a shifting device actuated by movement of said levers, and means for operatively connecting and disconnecting said shifting devices from said levers when said levers are in certain positions.

5. In transmission gearing and brake mechanism, a driving shaft and a driven shaft, forward and reverse change-speed driving connections between said shafts, a brake mechanism on said driven shaft, levers for controlling the operation of said driving connections and said brake mechanism, means for correlating the operation of said levers, said brake mechanism including a shifting device actuated by movement of said levers, and means for operatively connecting and disconnecting said shifting devices from said levers when said levers are in position to cause said change-speed driving connections to function.

6. In mechanism of the class described, a driving and a driven shaft, hydraulic change-speed clutch mechanism connecting said shafts, lever mechanism for controlling the action of said clutch mechanism, said change-speed clutch mechanism including a forward speed unit comprising a casing rotative with the driving shaft, liquid in the casing, a gyral drum in the casing and engaging the liquid, and means associated with the lever mechanism for changing the position of the drum to cause it to impart rotation from the driving shaft to the driven shaft.

7. In mechanism of the class described, a driving and a driven shaft, hydraulic change-speed clutch mechanism connecting said shafts, lever mechanism for controlling the action of said clutch mechanism, said change-speed clutch mechanism including a reverse rotation effecting unit comprising a casing rotative with but reversely of the driving shaft, liquid in the casing, a gyral drum in the casing and engaging the liquid, and means associated with the lever mechanism for changing the position of the drum to cause it to impart reverse rotation to the driven shaft.

8. In mechanism of the class described, wherein is provided a driven shaft, and means to drive said shaft; a brake unit comprising a stationary casing, liquid in the casing, a gyral drum in the casing and the liquid therein and movable therewith and therein, means forming bearing for said drum normally concentric to the axis of said driven shaft, and means to throw the said bearing means off center to set up movement of the drum in the casing resisted by the liquid.

9. In mechanism of the class described, wherein is provided a driven shaft, and means to drive said shaft; a brake unit comprising a stationary casing, liquid in the casing, a gyral drum in the casing and the liquid therein and movable therewith and therein, means forming bearing for said drum normally concentric to the axis of said driven shaft, means to throw the said bearing means off center to set up movement of the drum in the casing resisted by the liquid, and means to hold the drum to rotate with the casing while permitting a rolling movement of said drum therein.

10. In mechanism of the class described, wherein is provided a driven shaft, and means to drive said shaft; a brake unit comprising a stationary casing, liquid in the casing, a gyral drum in the casing and the liquid therein and movable therewith and therein, means forming bearing for said drum normally concentric to the axis of said driven shaft, means to throw the said bearing means off center to set up movement of the drum in the casing resisted by the liquid, and means to obstruct free circulation of the liquid in the casing and to hold the drum to rotate with the casing while permitting a rolling movement of said drum therein.

11. In mechanism of the class described, a driving shaft and a driven shaft, a forward rotation effecting unit rotatively secured to the driven shaft, and a reverse rotation effecting unit, each unit comprising a casing, liquid in the casing, and a gyral drum in the casing and in the liquid therein and normally concentric with the driven shaft, reverse rotation effecting connections between the forward unit and the reverse unit for causing the latter to rotate reversely of the former, and selective control devices for throwing the drum of a selected unit off center in its respective casing to cause that unit to impart its rotation to the driven shaft.

12. In mechanism of the class described, a driving shaft and a driven shaft, a forward rotation effecting unit rotatively secured to the driven shaft, a reverse rotation effecting unit, and a brake unit, each unit comprising a casing, liquid in the casing and a gyral drum in the casing and in the liquid therein and normally concentric with the driven shaft, reverse rotation effecting connections between the forward unit and the reverse unit for causing the latter to rotate reversely of the former, said brake unit casing being stationary, and selective control devices for throwing the drum of a selected unit off center in its respective casing to cause that unit to impart its rotation to the driven shaft, or in case of the brake unit to resist the rotation of the driven shaft and thereby effect a braking action.

13. In mechanism of the class described, a driving and a driven shaft, hydraulic change-speed clutch mechanism connecting said shafts, lever mechanism for controlling the action of said clutch mechanism, said change-speed clutch mechanism including a forward speed unit comprising a casing rotative with the driving shaft, liquid in the casing, a gyral drum in the casing and engaging the liquid, means associated with the lever mechanism for variably changing the position of the drum to cause it to impart rotation from the driving shaft to the driven shaft at varied speeds according to the varied position changes of said drum.

14. In mechanism of the class described, a driving shaft and a driven shaft, a forward rotation effecting unit relatively secured to the driven shaft, a reverse rotation effecting unit, each unit comprising a casing, liquid in the casing, a gyral drum in the casing and in the liquid therein and normally concentric with the driven shaft, reverse rotation effecting connections between the forward unit and the reverse unit for causing the latter to rotate reversely of the former, and selective control devices for throwing the drum of a selected unit off center in varied degrees of projection in its respective casing to cause that unit to impart its rotation to the driven shaft at varied speeds according to the degree of projection of said drums.

15. In mechanism of the class described, wherein is provided a driven shaft, and means to drive said shaft; a hydraulic clutching unit comprising a stationary casing, liquid in the casing, a gyral drum in the casing and the liquid therein and movable therewith and therein, means forming bearing for said drum normally concentric to the axis of said driven shaft, means to throw the said bearing means off center to set up movement of the drum in the casing resisted by the liquid, and means at one point in the casing to hold the drum to rotate with the casing but not relatively thereto and to permit a rolling movement of said drum in said casing for the purposes specified.

16. In mechanism of the class described, wherein is provided a driven shaft, and means to drive said shaft; a hydraulic clutching unit comprising a stationary casing, liquid in the casing, a gyral drum in the casing and the liquid therein and movable therewith and therein, means forming bearing for said drum normally concentric to the axis of said driven shaft, means off center to set up movement of the drum in the casing resisted by the liquid, means at one point in the casing to hold the drum to rotate with the casing but not relatively thereto and to permit a rolling movement of said drum in said casing, said holding means also constituting an abutment wall for preventing free circulation of liquid in the casing for the purposes specified.

17. In mechanism of the class described, wherein is provided a driven shaft, and means to drive said shaft; a hydraulic clutching unit comprising a stationary casing, liquid in said casing, a gyral drum in the casing and the liquid therein and movable therewith and therein, means forming bearing for said drum normally concentric to the axis of said driven shaft, and means to throw the said bearing means off center to set up movement of the drum in the casing resisted by the liquid for the purposes specified.

18. In mechanism of the class described, wherein is provided a driven shaft, and means to drive said shaft; a hydraulic clutching unit comprising a stationary casing, liquid in the casing, a gyral drum in the casing and the liquid therein and movable therewith and therein, means forming bearing for said drum normally concentric to the axis of said driven shaft, means to throw the said bearing means off center to set up movement of the drum in the casing resisted by the liquid, means at one point in the casing to hold the drum to rotate with the casing but not relatively thereto and to permit a rolling movement of said drum in said casing, said holding means also constituting an abutment wall for preventing free circulation of liquid in the casing, said casing having liquid filler and drain plugs and openings therefor, said drum having a slot cut therethrough to permit passage of liquid into the central portion of the casing, and said abutment wall having a section removable through a selected filler plug opening and including a portion for normally closing said drum slot.

19. In mechanism of the class described, wherein is provided a driven shaft, and means to drive said shaft; a hydraulic clutching unit comprising a stationary casing, liquid in the casing, a gyral drum in the casing and the liquid therein and movable therewith and therein, means forming bearing for said drum normally concentric to the axis of said driven shaft, means to throw the said bearing means off center to set up movement of the drum in the casing resisted by the liquid, means at one point in the casing to hold the drum to rotate with the casing but not relatively thereto and to permit a rolling movement of said drum in said casing, said holding means also constituting an abutment wall for preventing free circulation of liquid in the casing, said casing having liquid filler and drain plugs and openings therefor, said drum having a slot cut therethrough of a width coincident with that of the drum wall to permit passage of liquid into the central portion of the casing, and said abutment wall having a section removable through a selected filler plug opening and including a slot filler piece of a width to snugly fit and slide in the drum slot and as thick as the drum wall, and a rocker head on said piece seated on said removable section for the purposes specified.

20. In mechanism of the class described, a driving shaft and a driven shaft, a forward rotation effecting unit rotatively secured to the driven shaft, a reverse rotation effecting unit, means for selectively connecting one or the other of the units with the driven shaft to impart its rotation to that shaft, and means to cause the reverse rotation effecting unit to rotate at all times with, but in opposite direction to the rotation of the driving shaft.

21. In mechanism of the class described, a driving shaft and a driven shaft, a forward rotation effecting unit rotatively secured to the driven shaft, a reverse rotation effecting unit, means for selectively connecting one or the other of the units with the driven shaft to impart its rotation to that shaft, means to cause the reverse rotation effecting unit to rotate at all times with, but in opposite direction to the rotation of, the driving shaft, said opposite direction rotation effecting means comprising a ring gear secured to said reverse rotation effecting unit, a rim gear secured to the forward rotation effecting unit, idler gears meshing with said ring and rim gears, and means for stationarily mounting said idler gears.

22. In transmission gearing and brake mechanism, a driving shaft and a driven shaft, forward and reverse change-speed driving connections between said shafts, a brake mechanism on said driven shaft, a plurality of levers for controlling the operation of said driving connections and said brake mechanism, means for correlating the operation of said levers, and a housing for said mechanisms comprising end sections and a central section flange secured together, filler and drain plugs in said housing, a bearing for one end of the driving shaft in one end section, and bearings for the driven shaft in the other end section and in the end of the driving shaft.

23. In transmission gearing and brake mechanism, a driving shaft and a driven shaft, forward and reverse change-speed driving connections between said shafts, a brake mechanism on said driven shaft, a plurality of levers for controlling the operation of said driving connections and said brake mechanism, means for correlating the operation of said lever, a housing for said mechanism comprising end sections and a central section flange secured together, filler and drain plugs in said housing, a bearing for one end of the driving shaft in one end section, bearings for the driven shaft in the other end section and in the end of the driving shaft, and an auxiliary housing secured to said first mentioned housing for supporting and housing said levers and correlating means.

24. In mechanism of the class described, a driving shaft and a driven shaft, a forward rotation effecting unit rotatively secured to the driven shaft, a reverse rotation effecting unit, means for selectively connecting one or the other of the units with the driven shaft to impart its rotation to that shaft, means to cause the reverse rotation effecting unit to rotate at all times with. but in opposite direction to the rotation of, the driving shaft, said opposite direction rotation effecting means comprising a ring gear secured to said reverse rotation effecting unit, a rim gear secured to the forward rotation effecting unit, idler gears meshing with said ring and rim gears, means for stationarily mounting said idler gears, and a housing for said mechanisms comprising end sections and a central section flange secured together, filler and drain plugs in said housing, a bearing for one end of the driving shaft in one end section, and bearings for the driven shaft in the other end section and in the end of the driving shaft, said mounting means comprising a mounting ring on which said idler gears are freely rotatably mounted, said ring being clamped between the securing flanges of the central and one-end section of the said housing.

25. In mechanism of the class described, wherein is provided a driven shaft, and means to drive said shaft; a brake unit comprising a stationary casing, liquid in the casing, a gyral drum in the casing and the liquid therein and movable therewith and therein, means forming bearing for said drum normally concentric to the axis of said driven shaft, means to throw the said bearing means off center to set up movement of the drum in the casing resisted by the liquid, said bearing forming means comprising a disk rotatable with the driven shaft, a pivot pin projecting from the disk in parallel relation to the driven shaft, a bearing ring pivoted on the pin and having an enlarged central opening surrounding said driven shaft and on which ring said drum is rotatably mounted.

26. In mechanism of the class described, wherein is provided a driven shaft, and means to drive said shaft; a brake unit comprising a stationary casing, liquid in the casing, a gyral drum in the casing and the liquid therein and movable therewith and therein, means forming bearing for said drum normally concentric to the axis of said driven shaft, means to throw the said bearing means off center to set up movement of the drum in the casing resisted by the liquid, said bearing forming means comprising a disk rotatable with the driven shaft, a pivot pin projecting from the disk in parallel relation to the driven shaft, a bearing ring pivoted on the pin and having an enlarged central opening surrounding said driven shaft and on which ring said drum is rotatably mounted, and said throwing means comprising a rack segment on said bearing ring, a rotatable sleeve, a gear segment on the sleeve meshing with the rack segment, and means to rotate the sleeve for the purpose described.

27. In mechanism of the class described, wherein is provided a driven shaft, and means to drive said shaft; a brake unit comprising a stationary casing, liquid in the casing, a gyral drum in the casing and the liquid therein and movable therewith and therein, means forming bearing for said drum normally concentric to the axis of said driven shaft, means to throw the said bearing means off center to set up movement of the drum in the casing resisted by the liquid, said bearing forming means comprising a disk rotatable with the driven shaft, a pivot pin projecting from the disk in parallel relation to the driven shaft, a bearing ring pivoted on the pin and having an enlarged central opening surrounding said driven shaft and on which ring said drum is rotatably mounted, said throwing means comprising a rack segment on said bearing ring, a rotatable sleeve, a gear segment on the sleeve meshing with the rack segment, said sleeve having an angularly positioned slot, and longitudinally slidable shifter elements to engage said slots and impart rotation to said sleeve for the purposes described.

28. In mechanism of the class described, a variable-speed clutching unit comprising a drive shaft, a driven shaft, a casing rotatable with the drive shaft and surrounding the driven shaft and having an annular drum chamber, liquid in the casing and in the chamber, a flanged drum having its flange adapted to work in said chamber resisted by the liquid therein, means forming bearing for said drum normally concentric to the axis of said driven shaft, and means to throw said bearing means off center to set up movement of the drum in the casing.

29. In mechanism of the class described, a variable-speed clutching unit comprising a drive shaft, a driven shaft, a casing rotatable with the drive shaft and surrounding the driven shaft and having an annular drum chamber, liquid in the casing and in the chamber, a flanged drum having its flange adapted to work in said chamber resisted by the liquid therein, means forming bearing for said drum normally concentric to the axis of said driven shaft, means to throw said bearing means off center to set up movement of the drum in the casing, said bearing forming means comprising a disk rotatable with the driven shaft, a pivot pin projecting from the disk in parallel relation to the driven shaft, a bearing ring pivoted on the pin and having an enlarged central opening surrounding said driven shaft and on which ring said drum is rotatably mounted.

30. In mechanism of the class described, a variable-speed clutching unit comprising a drive shaft, a driven shaft, a casing rotatable with the drive shaft and surrounding the driven shaft and having an annular drum chamber, liquid in the casing and in the chamber, a flanged drum having its flange adapted to work in said chamber resisted by the liquid therein, means forming bearing for said drum normally concentric to the axis of said driven shaft, means to throw said bearing means off centre to set up movement of the drum in the casing, said bearing forming means comprising a disk rotatable with the driven shaft, a pivot pin projecting from the disk in parallel relation to the driven shaft, a bearing ring pivoted on the pin and having an enlarged central opening surrounding said driven shaft and on which ring said drum is rotatably mounted, and said throwing means comprising a rack segment on said bearing ring, a rotatable sleeve, a gear segment on the sleeve meshing with the rack segment, and means to rotate the sleeve for the purpose described.

31. In mechanism of the class described, a variable-speed clutching unit comprising a drive shaft, a driven shaft, a casing rotatable with the drive shaft and surrounding the driven shaft and having an annular drum chamber, liquid in the casing and in the chamber, a flanged drum having its flange adapted to work in said chamber resisted by the liquid therein, means forming bearing for said drum normally concentric to the axis of said driven shaft, means to throw said bearing means off center to set up movement of the drum in the casing, said bearing forming means comprising a disk rotatable with the driven shaft, a pivot pin projecting from the disk in parallel relation to the driven shaft, a bearing ring pivoted on the pin and having an enlarged central opening surrounding said driven shaft and on which ring said drum is rotatably mounted, and said throwing means comprising a rack segment on said bearing ring, a rotatable sleeve, a gear segment on the sleeve meshing with the rack segment, means to rotate the sleeve, said sleeve having an angularly positioned slot, and longitudinally slidable shifter elements to engage said slots and impart rotation to said sleeve for the purposes described.

32. In mechanism of the class described, a variable-speed clutching unit comprising a drive shaft, a driven shaft, a casing rotatable with the drive shaft, and surrounding the driven shaft and having a pair of annular drum chambers, liquid in the casing and in the chambers, a pair of flanged drums having their flanges adapted to work in said chambers resisted by the liquid therein, means forming bearing for said drums normally concentric to the axis of said driven shaft, means to throw said bearing means off center to set up movement of the drums in the casing, said bearing forming means comprising a pair of disks rotatable with the driven shaft, a pivot pin projecting from each disk in parallel relation to the driven shaft and from diametrically opposite parts of the disk, a bearing ring pivoted on each pin and having an enlarged central opening surrounding said driven shaft and on each of said rings one drum is rotatably mounted whereby when said bearings are thrown off center they will project eccentrically into the casing in balanced diametrically opposite relation.

33. In mechanism of the class described, a variable-speed clutching unit comprising a drive shaft, a driven shaft, a casing rotatable with the drive shaft, and surrounding the driven shaft and having a pair of annular drum chambers, liquid in the casing and in the chambers, a pair of flanged drums having their flanges adapted to work in said chambers resisted by the liquid therein, means forming bearing for said drums normally concentric to the axis of said driven shaft, means to throw said bearing means off center to set up movement of the drums in the casing, said bearing forming means comprising a pair of disks rotatable with the driven shaft, a pivot pin projecting from each disk in parallel relation to the driven shaft and from diametrically opposite parts of the disk, a bearing ring pivoted on each pin and having an enlarged central opening surrounding said driven shaft and on each of said rings one drum is rotatably mounted whereby when said bearings are thrown off center they will project eccentrically into the casing in balanced diametrically opposite relation, and said throwing means comprising a rack segment on each bearing ring, a rotatable sleeve, a gear segment on the sleeve meshing with each rack segment, and means to rotate the sleeve for the purpose described.

34. In mechanism of the class described, a variable-speed clutching unit comprising a driving shaft, a driven shaft, a casing composed of half sections flange-secured together to provide a hollow interior, said casing being mounted to surround a portion of the driven shaft and connected to rotate with the driving shaft, an annular ring in said casing cooperating with the peripheral internal surface of the casing in forming an annular chamber, liquid in the annular chamber, a gyral drum in the casing and having a flanged head operable in the annular chamber, a bearing ring secured to rotate with the driven shaft and on which said drum is rotatably mounted, and means to shift said ring and drum from a normal position concentric to the driven shaft axis to varying positions of eccentric relation to said driven shaft axis for the purposes described.

35. In mechanism of the class described, a variable-speed clutching unit comprising a driving shaft, a driven shaft, a casing composed of half sections flange-secured together to provide a hollow interior, said casing being mounted to surround a portion of the driven shaft and connected to rotate with the driving shaft, a partition ring clamped between the casing halves securing flanges, an annular ring secured to each side of the partition ring and each cooperating with the peripheral internal surface of the casing in forming an annular chamber at the respective side of said partition ring, liquid in the chamber, a gyral drum having a flanged head operable in each chamber, a pair of bearing rings secured to rotate with the driven shaft and on each of which one drum is rotatably mounted, and means to shift each said ring and the drum mounted thereon from a normal position concentric to the driven shaft axis to varying positions of eccentric relation to said driven shaft axis for the purposes specified, said rings being shiftable in diametrically opposite directions.

36. In mechanism of the class described, a variable-speed clutching unit comprising a driving shaft, a driven shaft, a casing composed of half sections flange-secured together to provide a hollow interior, said casing being mounted to surround a portion of the driven shaft and connected to rotate with the driving shaft, a partition ring clamped between the casing halves securing flanges, an annular ring secured to each side of the partition rings and each cooperating with the peripheral internal surface of the casing in forming an annular chamber at the respective side of said partition, a gyral drum having a flanged head operable in each chamber, a pair of bearing rings secured to rotate with the driven shaft and on each of which one drum is rotatably mounted, means to shift each said ring and the drum mounted thereon from a normal position concentric to the driven shaft axis to varying positions of eccentric relation to said driven shaft axis for the purposes specified, said rings being shiftable in diametrically opposite directions, said drums each including a thin side wall, and each said annular ring having its outer edge spaced a distance from the adjacent casing section wall to provide a space to snugly receive the respective drum wall.

37. In mechanism of the class described, a variable-speed clutching unit comprising a driving shaft, a driven shaft, a casing composed of half sections flange-secured together to provide a hollow interior, said casing being mounted to surround a portion of the driven shaft and connected to rotate with the driving shaft, a partition ring clamped between the casing halves securing flanges, an annular ring clamped to each side of the partition ring and each cooperating with the peripheral internal surface of the casing in forming an annular chamber at the respective side of said partition ring, liquid in the chamber, a gyral drum having a flanged head operable in each chamber, a pair of bearing rings secured to rotate with the driven shaft, and on each of which one drum is rotatably mounted, and means to shift each said ring and the drum mounted thereon from a normal position concentric to the driven shaft axis to varying positions of eccentric relation to said driven shaft axis for the purposes specified, said rings being shifted in diametrically opposite direction, and an abutment wall in each annular chamber to obstruct free circulation of oil therein, the abutment wall of one chamber being positioned diametrically opposite that of the adjacent chamber.

38. In mechanism of the class described, a variable-speed clutching unit comprising a driving shaft, a driven shaft, a casing composed of half sections flange-secured together to provide a hollow interior, said casing being mounted to surround a portion of the driven shaft and connected to rotate with the driving shaft, a partition ring clamped between the casing halves securing flanges, an annular ring secured to each side of the partition ring and each cooperating with the peripheral internal surface of the casing in forming an annular chamber at the respective side of said partition ring, liquid in the chamber, a gyral drum having a flanged head operable in each chamber, a pair of bearing rings secured to rotate with the driven shaft and on each of which one drum is rotatably mounted, means to shift each said ring and the drum mounted thereon from a normal position concentric to the driven shaft axis to varying positions of eccentric relation to said driven shaft axis for the purposes specified, said rings being shifted in diametrically opposite direction, an abutment wall in each annular chamber to obstruct free circulation of oil therein and to prevent rotation of the respective drum in and relatively to the casing.

39. In transmission gearing and brake mechanism, a driving shaft, and a driven shaft, forward and reverse change-speed driving connections between said shafts, a brake mechanism on said driven shaft, and shifter devices for selectively bringing into action forward or reverse connections or the brake mechanism, said devices including two sets of shifting rods, one to control the forward and reverse connections and one to control the brake mechanism, and means to shift the rod sets.

40. In transmission gearing and brake mechanism, a driving shaft and a driven shaft, forward and reverse change-speed driving connections between said shafts, a brake mechanism on said driven shaft, shifter devices for selectively bringing into action forward or reverse connections or the brake mechanism, said devices including two sets of shifting rods, one to control the forward and reverse connections and one to control the brake mechanism, and means to shift the rod sets comprising a pair of reversely moving levers so that any shifting action of the rod sets is accomplished by a forward movement of one of the levers.

41. In transmission gearing and brake mechanism, a driving shaft and a driven shaft, forward and reverse change-speed driving connections between said shafts, a brake mechanism on said driven shaft, and shifter devices for selectively bringing into action forward or reverse connections on the brake mechanism, said devices including two sets of shifting rods, one to control the forward and reverse connections and one to control the brake mechanism, means to shift the rod sets, and means to correlate the action of the shifter devices whereby when said rod sets are moved in one direction they effect a shifting and bringing into function of the forward speed connections, and when moved in the opposite direction they succesively shift all parts to neutral, then bring into action the brake mechanism and then the reverse speed action when desired.

42. In transmission gearing and brake mechanism, a driving shaft and a driven shaft, forward and reverse change-speed driving connections between said shafts, a brake mechanism on said driven shafts, two levers for controlling the operation of said driving connections and said brake mechanism, means for correlating the operation of said levers, said operation correlating means comprising oppositely movable shifter means cooperatively connecting said shifter rods to move in unison in opposite directions.

43. In transmission gearing and brake mechanism, a driving shaft and a driven shaft, forward and reverse change-speed driving connections between said shafts, a brake mechanism on said driven shafts, two levers for controlling the operation of said driving connections and said brake mechanism, means for correlating the operation of said levers, said operation correlating means comprising oppositely movable shifter means cooperatively connecting said shifter rods to move in unison in opposite directions, said last named means including separately pivoted rod moving levers and a releasable connection between said last named levers adapted when said rods are in certain positions relatively to one another to effect connection and disconnection whereby one of said rods may have limited movement independently of the other.

44. In transmission gearing and brake mechanism, a driving shaft and a driven shaft, forward and reverse change-speed driving connections between said shafts, a brake mechanism on said driven shafts, two levers for controlling the operation of said driving connections and said brake mechanism, means for correlating the operation of said levers, said operation correlating means comprising oppositely movable shifter means cooperatively connecting said shifter rods to move in unison in opposite directions, one of said shifting rods cooperating with the forward and reverse change-speed mechanism and the other of the rods cooperating with the brake mechanism for effecting the gear changes and the brake applications respectively, said means cooperatively connecting said shifter rods including releasable elements adapted when the rods are moved to gear connecting position to become disengaged whereby the brake operating rods will remain inoperative.

45. In transmission gearing and brake mechanism of the class described, wherein is provided a set of forward and reverse change-speed mechanism and a brake mechanism; shifting rods for the respective mechanisms, oppositely moving levers for effecting the action of said shifting rods, connections between said levers and the shifting rods, said connections including releasable elements adapted when said levers are moved to certain positions to cause said shifting rods to operate in unison in opposite direction and when said levers are moved to other positions to operatively disconnect said shifting rods from one another whereby but one shifting rod is moved while the other remains at rest.

46. In transmission gearing and brake mechanism wherein is provided forward and reverse change-speed gearing and a brake, a rock shaft, elements mounted on said rock shaft and gear-connected to move in unison in opposite directions, at least one lever for operating said rock shaft, a shifting lever mounted on said rock shaft, a gear shifting rod connected with said last named lever whereby movement of the rock shaft will be imparted to said rod, a brake applying rod, a second rock shaft with lever connected to said brake applying rod, and a connection with said rock shafts whereby movement of the first rock shaft will impart a reverse movement to the second mentioned rock shaft, said connections between said rock shafts including releasable elements adapted when said first mentioned rock shaft is moved through certain arcs to disconnect said rock shafts whereby to apply the brake only when the gearing is in neutral position.

47. In transmission gearing and brake mechanism wherein is provided forward and reverse change-speed gearing and a brake, a rock shaft, elements mounted on said rock shaft and gear-connected to move in unison in opposite direction, at least one lever for operating said rock shaft, a shifting lever mounted on said rock shaft, a gear shifting rod connected with said last named lever whereby movements of the rock shaft will be imparted to said rod, a brake applying rod, a second rock shaft with lever connected to said brake applying rod, and a connection between said rock shafts whereby movement of the first rock shaft will impart a reverse movement to the second mentioned rock shaft, said connections between said rock shafts including releasable elements adapted when said first mentioned rock shaft is moved through certain arcs to disconnect said rock shaft whereby to apply the brake only when the gearing is in neutral position, said releasable connections including segments having detent and recess connections with means for automatically throwing the detent into and out of its connected position at times.

LEONARD KENNETH HEINER.
WILLIAM McKINLEY MOORE.